Figure 1:
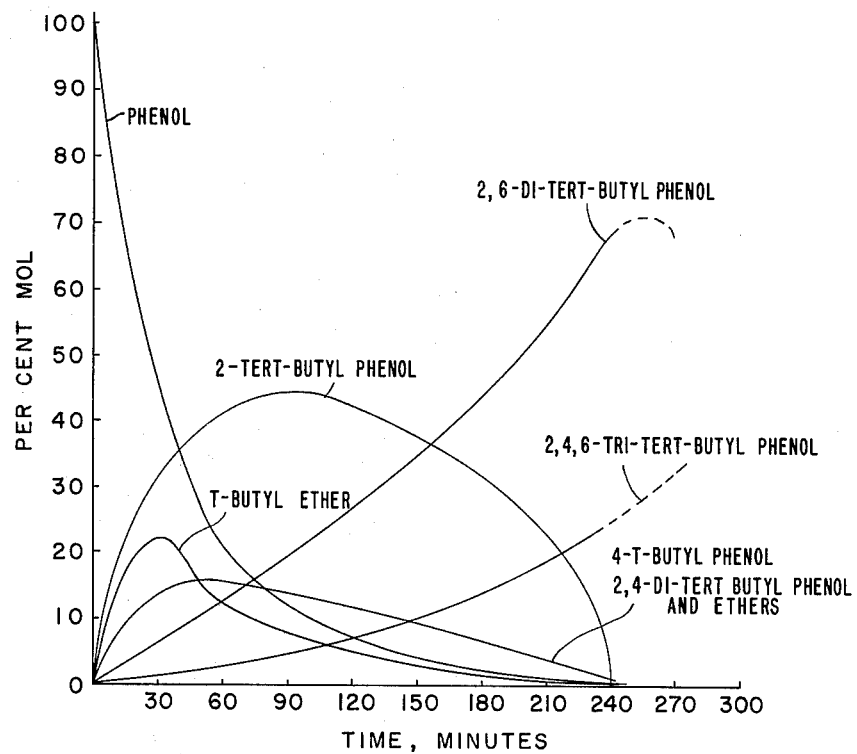

INVENTORS:
V. W. BULS
A. B. HALL
THEIR ATTORNEY

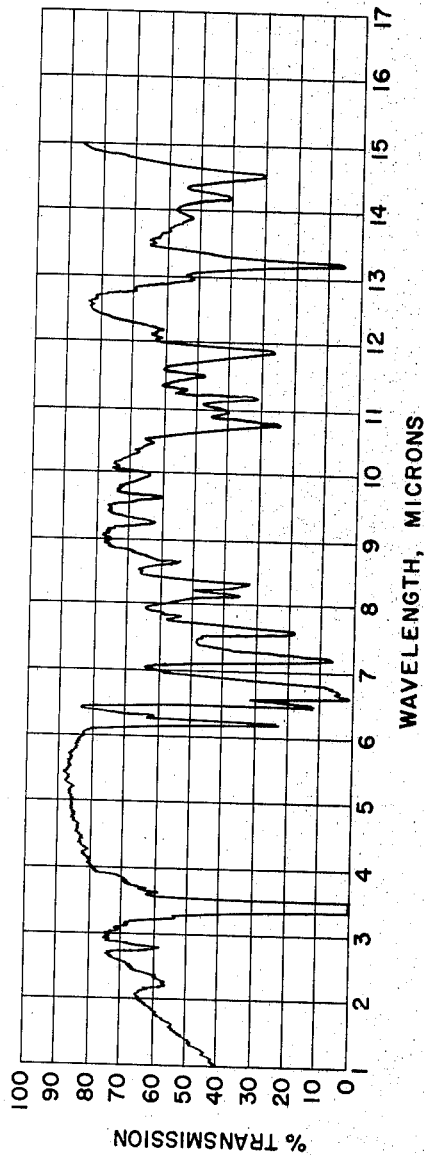
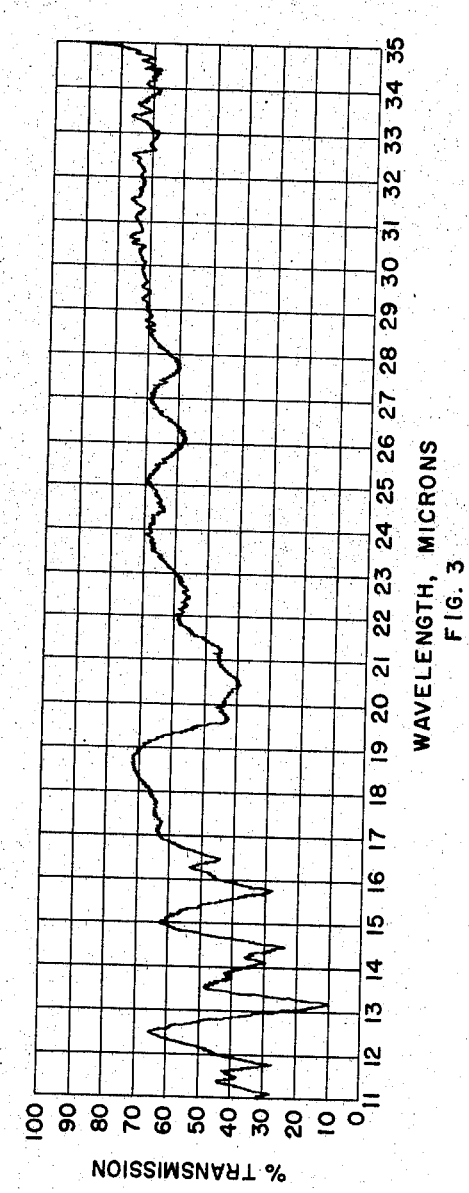
INVENTORS:
V. W. BULS
A. B. HALL
BY: *Raul D. Zentner*
THEIR ATTORNEY United States Patent Office 3,200,157
Patented Aug. 10, 1965

3,200,157
ALKYLATION PROCESS
Vernon W. Buls, Alamo, and Albert B. Hall, Berkeley, Calif., assignors to Shell Oil Company, New York, N.Y., a corporation of Delaware
Filed May 22, 1961, Ser. No. 111,648
12 Claims. (Cl. 260—624)

This invention relates to the preparation of ortho-alkyl substituted phenols. More particularly, it relates to the use of a novel type of catalyst in the preparation of ortho-alkylated phenols and to a method for preparing that catalyst.

With the increasing importance of antioxidants derived from ortho-alkylated phenols, a variety of processes have been developed for the selective ortho-alkylation of hydroxyaromatic nuclei. Such catalysts as sulfuric acid, aluminum trihalides, and similar Friedel-Crafts catalysts, and such alkylating agents as olefins and alkyl halides have been used to produce the desired o-alkyl and di-o-alkyl phenols. Mere discovery of a suitable catalyst has, however, been found to be insufficient for the development of a suitable high-yield selective alkylation process. The choosing of appropriate reaction conditions, i.e., reactant ratios; temperature; time and pressure ranges; and the like has proved to be equally important.

It is an object of the present invention to provide an improved catalytic process for the selective alkylation of phenols with olefins. Another object of the invention is the provision of a novel catalyst for the conduct of the phenol alkylation. Provision of novel set of conditions for the conduct of the selective phenol alkylation is yet another object of the invention. Other objects will be apparent from the following detailed description of the process of the invention.

These objects are accomplished in the invention by the process which comprises mixing a phenol having a replaceable hydrogen atom on the ring carbon atom para to the hydroxyl group and a replaceable hydrogen atom on at least one of the ring carbon atoms ortho to the hydroxyl group; from about 2 to about 5 moles of olefin per mole of phenol; from about 0.001 to about 0.20 mole of an aluminum compound of the formula $Al(X)(X')_2$ where X is halogen and X' is selected from the group consisting of halogen and phenoxide, per mole of phenol; and from about 0.0006 to about 0.01 mole of water per mole of phenol; heating the resulting mixture at a temperature from about 100° C. to about 200° C. and a pressure from about 100 p.s.i.g. to about 5000 p.s.i.g., and separating the ortho-alkylated phenol from the reaction mixture.

The phenols used in the process of the invention can be mono- or polynuclear aromatic mono- or polyhydroxy compounds, such as hydroxybenzenes, hydroxynaphthalenes, and the like. Preferred compounds, however, are the mononuclear monohydroxy benzenes. The phenol employed should preferably be one wherein the ring carbon atom para to the hydroxyl group and one or both of the ring carbon atoms ortho to the hydroxyl group is provided with a replaceable hydrogen atom. Thus, the meta ring carbon atoms and up to one ortho ring carbon atom may have other substituents such as halogen atoms, alkyl substituents and the like. The particularly preferred phenols will have in general the formula ROH, representing the structure

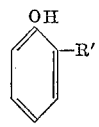

where R' is hydrogen or alkyl.

Exemplary phenols include such alkyl phenols as o-cresol, m-cresol; o-ethyl phenol; o-isopropyl phenol; 2,5-diethyl phenol; 3,5-xylenol; o-tert-butyl phenol; 2,3,5-triisopropyl phenol; o-octyl phenol and the like. Other types of phenols include halophenols such as o-chlorophenol; m-bromophenol; 2,5-diiodophenol; 2,3,5-trifluorophenol, and similar compounds. Other substituents on the phenol may include phenyl, amino, nitro and alkoxy substituents. A particularly useful class of starting phenols is that having no more than one alkyl group on the hydroxy-substituted ring, and that alkyl group having up to 8 carbon atoms. The process of the invention is particularly well adapted, however, to the ortho-alkylation of phenol itself, and phenol is therefore the preferred hydroxyaromatic reactant.

The olefins with which the phenolic compound is reacted are those hydrocarbon molecules having one olefinic double bond, preferably in the alpha position, and preferably having up to ten carbon atoms. Such compounds are represented by ethylene, propene, the butenes, pentenes, hexenes, cyclohexenes, heptenes, octenes, nonenes and decenes. Particularly preferred hydrocarbons are the alpha-olefins having from four to seven carbon atoms and one tertiary carbon atom. Exemplary of such branched olefins are isobutylene and isoamylene. Also useful as olefinic reactants are aryl olefinic hydrocarbons, such as vinyl benzene, allyl benzene, vinyl naphthalene and alphamethyl styrene.

An important feature of the present invention, and one believed to be in part responsible for the superior results obtained thereby, is the conduct of the alkylation in a solvent consisting of an excess of the olefin. As a consequence, an olefin-phenol molar ratio greater than one is employed. Molar ratios of greater than about 6 moles of olefin per mole of the phenol have been found to be uneconomical because the reaction rate of the selective alkylation decreases at high olefin-phenol ratios. As a consequence, molar ratios of about 2 to about 5 moles of olefin per mole of phenol give the best results.

In general, the phenol alkylations of the art have been conducted under rather moderate conditions of temperature and pressure. Thus, in the alkylations described in the patent literature, the para-alkylation of phenols with olefins has rarely been conducted at temperatures in excess of about 100° C. or pressures much in excess of atmospheric. It has been found, however, that by conducting the alkylation reaction of this invention at temperatures in excess of about 100° C. and pressures of about 200 p.s.i.g., the predominant product of the alkylation is the ortho-alkylated rather than the para-alkylated phenol. Under these conditions, the olefinic reactant is a liquid, and the aluminum halide-catalyzed reaction between the olefin and the phenol is conducted entirely in the liquid phase.

Thus, operative temperatures for conduct of the alkylation reaction of this invention lie between about 100° C. and about 200° C., while preferred temperatures lie between about 100° C. and 150° C. At higher temperatures the yield of the 2,6-dialkyl phenol decreases, while at lower temperatures the reaction slows down to uneconomic rates, although satisfactory yields of the 2,6-dialkyl phenols are obtained. For such reactions as the aluminum chloride-catalyzed alkylation of phenol with isobutylene, temperatures between about 120° C. and 140° C. give excellent yields of 2,6-di-tert-butyl phenol at convenient reaction rates.

At these temperatures, the pressure at which the alkylation reaction may be conducted may be varied over a wide range without impairing the yield of ortho-alkylated product. Pressures in excess of about 100 p.s.i.g. are preferred, but the alkylation may be conducted at a pressure up to the pressure limit of the reaction vessel. Pressures between about 250 p.s.i.g. to about 5000 p.s.i.g. have been observed to be operable, and pressures on the order of about 250 p.s.i.g. to about 900 p.s.i.g. at temperatures of about 140° C. give excellent results. The lowest pressure required for the reaction will be that pressure required to maintain the olefinic reactant in the liquid phase at the temperature of the alkylation reaction.

Since the phenolic and olefinic reactants and the alkylated products are liquids at the alkylation temperatures, there is no need for added solvent in which to conduct the alkylation. For the purposes of heat transfer and temperature control, the use of inert solvents and diluents may be employed. Such diluents are preferably such non-reactive high-boiling solvents as the long-chain paraffins, e.g., n-nonane, n-undecane, n-hexadecane, and the like. It is also desirable to conduct the reaction in the absence of air or molecular oxygen, and such non-reactive or relatively inert gases as nitrogen, helium, argon or carbon dioxide may be used to blanket the reaction.

An important feature of the invention is the use of an aluminum compound of the formula $Al(X)(X')_2$ wherein X is halogen, i.e., bromine, chlorine or iodine, and $X'$ is selected from the group consisting of halogen and phenoxide, in conjunction with water. Exemplary compounds where both X and $X'$ are halogen are aluminum triiodide and aluminum tribromide while the preferred aluminum trihalide, because of its superior activity, is aluminum trichloride, $AlCl_3$. However, equally suitable selective alkylation can be obtained by using aluminum monohalodiphenoxides. These compounds have the general structure

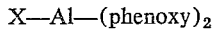

X—Al—(phenoxy)$_2$ where X has the above meaning and each phenoxy radical is preferably that obtained by removal of a hydroxylic hydrogen from hydroxyaromatic reactant or the alkylated product derived therefrom.

Typical of such compounds are aluminum monochlorodiphenate, aluminum monobromodicresylate, aluminum monoiododixylenate, aluminum monochlorodinaphtholate, and the like.

The aluminum compound of the type described is employed in the reaction mixture in a catalytic amount, preferably from about 0.001 to about 0.20 mole per mole of phenol. If desired, however, larger or smaller amounts of the aluminum compound may be added to obtain the rates and yields desired.

Surprisingly, it has been found that superior rates of alkylation are obtained when a controlled amount of water is included in the reaction mixture. This is surprising, since in general it has been believed that the presence of water in systems containing Friedel-Crafts catalysts would inactivate the catalyst and terminate the reaction. It has now been discovered, however, that if a controlled amount of water is employed in the system, better rates of alkylation to yield of ortho-alkylated phenol are obtained. If too small an amount of water below about 0.0006 mole per mole of phenol is used, the advantages of the water are not obtained; while if an excess of water, above about 0.005 mole and particularly above about 0.01 mole per mole of phenol, will reduce the activity of the catalyst.

The water may be added in any desired form, either included in the reactants as, for example, in relatively "wet" phenol or isobutylene; or it may be added as liquid water to the relatively dry reaction system.

The reaction rate of the system, in particular, is particularly sensitive to water content. At water content below the desired range, the reaction becomes unstable and at concentrations below about 0.0006 mole of water per mole of phenol the reaction rate is almost inoperatively slow. Maximum reaction rates to a given yield were obtained at a water concentration of about 0.8 to 1.0 millimole of water per mole of phenol. Because the water content has such a pronounced effect on the reaction rate, it is important, especially in continuous reaction, that the water concentration in the system be held constant.

The phenol, olefin, aluminum compound and water may be combined in any desired sequence in order to conduct the process of the invention. Most conveniently, the aluminum compound and the water are added to the phenol or to a portion thereof, and after thorough mixing, the phenol mixture and the olefin are brought together in the desired proportions under suitable conditions of temperature and pressure. In this way, complete mixing of the phenol reactant, water and aluminum compound may be effectively brought about prior to the start of the alkylation itself. Under continuous conditions, the phenol, olefin, water and aluminum compound may be mixed simultaneously, or the aluminum compound and water metered into either reactant stream prior to mixing of the reactants.

Thus, the reaction may readily be performed in a batchwise manner by charging the phenolic reactant, in solid or liquid state, to a stirred vessel, mixing the aluminum compound and water with it, and then passing the mixture into the liquid olefin in the alkylation reactor, preferably as fast as it can be added at the particular alkylation pressure and temperature. Alternatively, the alkylation may be conducted continuously by making up the liquid phenol-aluminum compound-water mixture in one zone of a continuous stream and then passing the liquid mixture to a second zone where it is mixed with the liquid olefin under appropriate conditions of mixing, concentrations, temperature and pressure.

The process of the invention is most effective when the phenol-catalyst mixture is at all times in contact with an excess of the olefin. For this reason, the phenol-catalyst mixture is preferably added to an excess of olefin rather than vice versa. When the olefin is added slowly to the phenol and the phenolic reactant is in excess, the para-alkylation of the phenolic reactant is the predominant reaction. Should it be necessary to add the olefin to the phenol-catalyst mixture, the olefin should be added very quickly so that the excess olefin is present at an early stage in the reaction. In any case, the reaction should be stopped at a point before alkylation of the 2,6-dialkyl phenol product to the undesired 2,4,6-trialkyl phenol becomes the dominant reaction. Most conveniently, the separation of the o-alkylated product is accomplished before the absolute concentration of that product is at a maximum in the alkylation system.

The period during which the process should be stopped and the 2,6-dialkyl phenol product separated is conveniently delineated by two times $t_1$ and $t_2$. At time $t_1$ the molar concentration of the desired 2,6-dialkyl phenol product is at a maximum relative to the concentrations in the reaction mixture of the undesired by-products, 2,4-dialkyl phenol and 4-alkyl phenol and the incompletely alkylated 2-alkyl phenol. At this time, the absolute concentration of the 2,6 product is, of course, increasing in such a manner that the competing reactions are producing by-products in significant quantities. This time $t_1$ is analytically determined by establishing the time at which the ratio of molar concentrations $$\frac{\text{2,6-dialkyl phenol}}{\text{2,6-dialkyl phenol}+\text{4-alkyl phenol}+\text{2,4-dialkyl phenol}+\text{2,4,6-trialkyl phenol}}$$

reaches a maximum.

At that time $t_1$ the absolute concentration of the desired 2,6-dialkyl phenol is continuing to increase in the reaction mixture, and it reaches a maximum at a subsequent time $t_2$. After $t_2$, the 2,6-dialkyl phenol becomes converted to 2,4,6-trialkyl phenol, an undesired competing product. Although considerable 2,6-dialkyl phenol remains in the reaction mixture after the time $t_2$, the increasing amounts of the undesired by-products noted coupled with the decline in absolute concentration of the 2,6-dialkyl phenol product render its recovery less economically attractive.

As a consequence, the time for recovering the desired 2,6-dialkyl phenol in maximum yield is conveniently limited to a period between the times $t_1$ and $t_2$ defined above. Naturally, the absolute times for the length of the reaction will depend on the process variables, e.g., the concentrations of catalyst and reactants, and the temperature and pressure at which the catalyst mixing and alkylation are conducted.

When the process of the invention is employed for the preparation of mono-ortho-alkyl phenol, similar considerations apply. Under these circumstances, the time $t_1$ is analytically determined by establishing the time at which a maximum is reached in the ratio of molar concentrations $$\frac{\text{2-alkyl phenol}}{\text{2-alkyl phenol}+\text{2,6-dialkyl phenol}+\text{4-alkyl phenol}+\text{2,4-dialkyl phenol}+\text{2,4,6-trialkyl phenol}}$$

while $t_2$ refers to the time at which the absolute concentration of 2-alkyl phenol in the system is at a maximum.

Catalyst promoters may also be employed in the process of the invention. Such promoters comprise halogenated hydrocarbons prepared, for example, from the olefin employed as the alkylating agent and the halide constituent of the aluminum halide catalyst. Such promoters include propyl chloride, butyl bromide, tert. butyl chloride, tert. amyl chloride, and the like. For example, the use of tert. butyl chloride in quantities of about 0.1 mole per mole of aluminum chloride increases the reaction rate in the aluminum chloride-catalyzed alkylation of phenol with isobutylene. Quantities of the promoter of from 0.01 to 1.0 mole per mole of the catalyst are found to give desirable results, while concentrations of 0.05 to 0.2 mole of promoter per mole of catalyst are preferred. Other reagents suitable for use as promoters include the anhydrous hydrogen halides, including hydrogen chloride. The promoters may be added to the catalyst-phenol mixture during or after its preparation, or they may be added to the olefin or to the entire reaction mixture during the process.

The alkylated phenolic reaction products are separated from the reaction mixture at $t_2$, or as shortly as possible thereafter, by conventional industrial methods, such as fracitonal distillation. Unalkylated and monoalkylated phenolic reactants and products may conveniently be removed from the reaction mixture prior to distillation by extraction with caustic, the caustic also serving to inactivate the catalyst. The olefin and polyalkylated products are readily separated by fractional distillation. Since such reactions as isomerization of mono- and di-alkylated phenolic compounds in the reaction mixture in the presence of the aluminum halide catalyst will take place even after the pressure and temperature of the reaction mixture have been reduced, it is worthwhile to conduct these separations as soon as $t_2$ as possible.

The alkylated products which are obtained by practice of the invention in the manner and under the conditions described include both mono-ortho-alkylated and di-ortho-alkylated phenols. Exemplary of the first class of phenols are o-ethyl phenol; o-propyl phenol; o-isobutyl phenol; o-sec-butyl phenol; o-t-butyl phenol; o-n-butyl phenol; o-amyl phenol; o-t-amyl phenyl; o-cyclohexyl phenol; o-hexyl phenol; o-cumyl phenol and the like. Exemplary of the di-ortho-alkylated phenol products are 2-methyl-6-ethyl phenol; 2,6-diethyl phenol; 2-methyl-6-t-butyl phenol; 2,6-di-t-butyl phenol; 2-ethyl-6-t-amyl phenol; 2,6-di-t-amyl phenol; 2,6-diisopropyl phenol; 2,6-dicyclohexyl phenol, and the like. The preferred products will in general have the structure

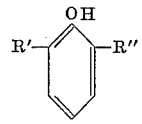

where R' is hydrogen or alkyl and R" is alkyl.

The unexpected and superior selective alkylation obtained when practicing the process of the invention stems from its employment of a novel aluminum catalyst. This catalyst is the in situ reaction product of the components of the system and has been determined to be aluminum monohydroxy diphenoxide. The structure of this catalyst is

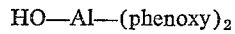

where each phenoxy substituent is that derived by removal of the hydroxylic hydrogen atom from the starting or product phenol. Exemplary of such aluminum monohydroxy phenoxides are aluminum monohydroxy diphenate; aluminum monohydroxy dicresylate; aluminum monohydroxy dixylenate; and the aluminum monohydroxy di(alkyl phenolates) derived from the phenols described. The catalyst is formed under the conditions of the process by reaction of the added aluminum compound and can, if desired, be separated and reused at the end of the alkylation.

It will be apparent to those skilled in the art that the aluminum monohydroxy diphenoxide which catalyzes the process of the invention can be prepared in alternative ways. Thus, it can be prepared separately and added to the alkylation system containing the phenol and the olefin. Thus, the process of the invention can be conducted by reacting a phenol having a replaceable hydrogen atom on the ring carbon atom para to the hydroxyl group and a replaceable hydrogen atom on at least one of the ring carbon atoms ortho to the hydroxyl group, and an olefin, in a molar ratio of from about 2 to about 5 moles of olefin per mole of phenol, in liquid phase, in the presence of a catalytic amount of aluminum monohydroxy diphenoxide, and separating the ortho-alkylated phenol from the reaction mixture.

The catalytic amount of the aluminum monohydroxy diphenoxide is that amount required to produce ortho-alkylation of the phenolic reactant. The preferred amount of the aluminum monohydroxy diphenoxide is from about 0.0006 to about 0.01 mole per mole of phenol, although greater or lesser amounts of the catalyst may be used, depending on the reactants and reaction conditions employed.

The novel and improved features of the invention are illustrated by the following examples. It should be understood, however, that these examples are merely illustrative and are not to be regarded as limitations to the appended claims, since the basic teachings thereof may be varied at will as will be understood by one skilled in the art. In the examples, the proportions are expressed in parts by weight unless otherwise noted.

EXAMPLES

A series of batch experiments were conducted under carefully controlled conditions. Dried phenol (94 grams) was charged to a glass vessel equipped with a stirrer, a bottom draw-off fitting, and a vent. The contents of the vessel were warmed to 150° C. with stirring and predried aluminum chloride was added in known amounts to the phenol. After the HCl evolved from the system had been vented, the phenol mixture was drawn by vacuum into a heated surge tank.

To start a run, a one-liter horizontal autoclave was quickly charged with the desired amount of isobutylene and heated to reaction temperature. The phenol mixture was then blown with nitrogen pressure into the reactor. The results of these runs are presented in the following table. In all of the experiments described, 3 moles of isobutylene and 1 mole of phenol were used and the alkylation was conducted at 120° C.

These data are presented diagrammatically as FIGURE 1.

The active catalytic species was separated from the reaction system by precipitation thereof with hexane from an aliquot of the system. Analysis of the sample gave the following data:

|  | Al | C | H | Phenolate |
|---|---|---|---|---|
| Calculated for Al(OH)(OC$_6$H$_5$)$_2$ | 11.7 | 62.5 | 4.8 | 80.7 |
| Found | 9.8 | 66.3 | 5.0 | 82.0 |

Table I

| AlCl$_3$ Charged, Moles | Total Water Moles | Max. 2,6-di-tert-butyl phenol conc'n, molar percent | Time at 2,6-di-tert-butyl phenol max. min. | Max. 2,6-di-tert-butyl phenol yield, molar percent | t-Butyl chloride, moles |
|---|---|---|---|---|---|
| 0.005 | 0.00062 | 80 | 230 | 90 | |
| 0.01  | 0.00065 | 80 | 227 | 92 | |
| 0.005 | 0.00071 | 77 | 167 | 88 | |
| 0.01  | 0.00073 | 82 | 310 | 90 | |
| 0.02  | 0.00073 | 76 | 175 | 88 | |
| 0.005 | 0.00078 | 82 | 340 | 91 | |
| 0.02  | 0.00078 | 77 | 143 | 89 | |
| 0.01  | 0.00079 | 81 | 204 | 89 | 0.008 |
| 0.01  | 0.00079 | 78 | 142 | 88 | 0.004 |
| 0.005 | 0.00082 | 80 | 199 | 89 | |
| 0.01  | 0.00082 | 79 | 164 | 90 | |
| 0.01  | 0.00086 | 77 | 137 | 86 | 0.002 |
| 0.01  | 0.00086 | 80 | 142 | 88 | |
| 0.01  | 0.00086 | 80 | 192 | 89 | |
| 0.01  | 0.00088 | 80 | 160 | 89 | |
| 0.02  | 0.00088 | 77 | 140 | 88 | |
| 0.02  | 0.00090 | 71 | 102 | 85 | |
| 0.02  | 0.00094 | 72 | 94  | 86 | |
| 0.02  | 0.00098 | 75 | 109 | 86 | |
| 0.005 | 0.0010  | 82 | 400 | 91 | |
| 0.02  | 0.0010  | 75 | 107 | 88 | |
| 0.005 | 0.0011  | 81 | 337 | 90 | |
| 0.01  | 0.0011  | 78 | 152 | 88 | |
| 0.01  | 0.0011  | 83 | 214 | 91 | |
| 0.02  | 0.0012  | 79 | 109 | 89 | |
| 0.02  | 0.0016  | 76 | 127 | 87 | |
| 0.02  | 0.0017  | 77 | 148 | 89 | |
| 0.01  | 0.0019  | 82 | 276 | 90 | |
| 0.01  | 0.0034  | 82 | 375 | 91 | |

When the reaction was conducted with bone-dry reactants and AlCl$_3$, however, no production of 2,6-di-tert-butyl phenol took place at all.

A typical run was made with periodic sampling. In this run, a reactor was charged with the above reactants in a ratio of 3 moles of isobutylene, 1 mole of phenol, 0.02 mole of aluminum chloride and 0.0014 mole of water. The reaction was carried out at 120° C. at a pressure of 300 p.s.i.g. Samples were periodically taken from the reaction mixture and analyzed. The results of these analyses are tabulated below:

Table II

| | Mole percent | | | |
|---|---|---|---|---|
| Time, minutes | 60 | 120 | 180 | 240 |
| Compound: | | | | |
| Phenol | 20.9 | 6.1 | 3.2 | 0.9 |
| t-Butyl ether | 11.5 | 5.6 | 1.9 | |
| 2-tert-butyl phenol | 41.3 | 39.7 | 30.2 | 3.0 |
| 4-tert-butyl phenol | 1.7 | 0.6 | 0.2 | |
| Di(2-tert-butylphenyl)ether | 3.1 | 2.9 | 1.8 | 0.4 |
| 2,6-di-tert-butyl phenol | 10.4 | 26.9 | 42.5 | 68.8 |
| 2,4-di-tert-butyl phenol | 7.0 | 7.7 | 5.2 | 2.2 |
| Di(2,4-di-tert-butylphenyl)ether | 0.3 | | | |
| 2,4,6-tri-tert-butyl phenol | 3.8 | 10.5 | 15.0 | 24.8 |

An infra-red spectrum of a mineral oil (Nujol) mull of the aluminum catalyst was also made. The spectrum, from 11.0μ to 35μ, is shown in FIGURES 2 and 3. These data show the catalyst to be aluminum monohydroxy diphenoxide.

A run was made using phenol and isobutylene in a mole ratio of 3/1, with 0.02 mole aluminum hydroxy diphenoxide per mole of phenol as the catalyst. The system was dried so that only 0.001 mole of water per mole of phenol was present in the reaction system. The run was conducted at 120° C. and 300 p.s.i.g., as in the previous runs. Selective ortho-alkylation of the phenol was, as in the runs above, the predominant alkylation reaction taking place in the system.

Using the conditions described, a typical alkylation was run with phenol and isobutylene. To the phenol was mixed aluminum monochlorodiphenoxide in a mole ratio of 0.02 mole of aluminum monochlorodiphenoxide per mole of phenol and with 0.0020 mole of water per mole of phenol. The mixture was then passed to the reactor and promptly mixed with isobutylene, in a ratio of 3 moles of isobutylene per mole of phenol. The alkylation was conducted at 120° C. and 300 p.s.i.g. The reaction mixture was periodically sampled and the samples analyzed. Results of these determinations are set forth in the following table.

*Table III*

| Time, minutes | Mole percent | | | |
|---|---|---|---|---|
| | 60 | 120 | 150 | 180 |
| Compound: | | | | |
| Phenol | 59.6 | 17.9 | 6.9 | 1.4 |
| t-Butyl ether | 10.2 | 3.1 | 3.5 | 1.2 |
| 2-di-tert-butyl phenol | 22.0 | 48.9 | 30.0 | 4.5 |
| 2,6-di-tert-butyl phenol | 5.8 | 25.4 | 52.1 | 64.2 |
| 2,4,6-tri-tert-butyl phenol | 0.2 | 1.6 | 3.1 | 23.9 |
| Other components | 2.2 | 3.1 | 2.5 | 4.8 |

Analysis of the active catalytic species shows it to be aluminum monohydroxy diphenoxide.

When conducted in the same manner but with less than 0.0001 mole of water per mole of phenol present in the system, no measurable ortho-alkylation of phenol occurs.

We claim as our invention:

1. The process for selectively alkylating a phenol which comprises mixing a phenol having a replaceable hydrogen atom on the ring carbon atom para to the hydroxyl group and on at least one of the ring carbon atoms ortho to the hydroxyl group, from about 2 to about 5 moles of olefin having up to 10 carbon atoms per mole of phenol; from about 0.001 mole to about 0.20 mode of aluminum trihalide per mole of phenol, and from about 0.0006 to about 0.01 mole of water per mole of phenol; heating the resulting mixture comprising essentially said phenol, said olefin, said aluminum trihalide and said water at a temperature of from about 100° C. to about 200° C. and a pressure from about 100 p.s.i.g. to about 5000 p.s.i.g., and separating ortho-alkylated phenol from the reaction mixture.

2. The process of claim 1, wherein the phenol is phenol.

3. The process of claim 1, wherein the olefin is isobutylene.

4. The process of claim 1 wherein the aluminum trihalide is aluminum trichloride.

5. The process for selectively alkylating phenol which comprises mixing phenol, from about 2 to about 5 moles of isobutylene per mole of phenol; from about 0.001 to about 0.20 mole of aluminum chloride per mole of phenol; and from about 0.0006 to about 0.01 mole of water per mole of phenol; heating the resulting mixture comprising essentially phenol, isobutylene, aluminum chloride and water at a temperature of from about 100° C. to about 200° C. and a pressure from about 100 p.s.i.g. and about 5000 p.s.i.g.; and separating 2,6-di-tert-butyl phenol from the reaction mixture.

6. The process for selectively alkylating a phenol, which comprises reacting together a phenol having a replaceable hydrogen atom on the ring carbon atom para to the hydroxyl group and a replaceable hydrogen atom on at least one of the ring carbon atoms ortho to the hydroxyl group; and an olefin having up to 10 carbon atoms, in a molar ratio of from about 2 to about 5 moles of olefin per mole of the phenol, at a temperature of from about 100° C. to about 200° C. in liquid phase, said liquid phase comprising essentially said phenol and said olefin and containing a catalytic amount of aluminum monohydroxy diphenoxide, and separating the ortho-alkylated phenol from the reaction mixture.

7. The process of claim 6 wherein the phenol is phenol.

8. The process of claim 6 wherein the olefin is isobutylene.

9. The process of claim 6 wherein the olefin is propylene.

10. The process for selectively alkylating phenol, which comprises reacting together phenol and isobutylene, in a molar ratio of from about 2 to about 5 moles of isobutylene per mole of phenol at a temperature from about 100° C. to about 200° C., in liquid phase, said liquid phase comprising essentially phenol and isobutylene and containing a catalytic amount of aluminum monohydroxy diphenoxide, and separating ortho-alkylated phenol from the reaction mixture.

11. The process for selectively alkylating a phenol, which comprises mixing a phenol having a replaceable hydrogen atom on the ring carbon atom para to the hydroxyl group and on at least one of the ring carbon atoms ortho to the hydroxyl group from about 2 to about 5 moles of olefin having up to 10 carbon atoms per mole of phenol; from about 0.001 to about 0.20 mole of aluminum monochlorophenoxide per mole of phenol; and from about 0.0006 to about 0.01 mole of water per mole of phenol; heating the resulting mixture comprising essentially said phenol, said olefin, said aluminum monochlorophenoxide and said water at a temperature of from about 100° C. to about 200° C. and a pressure from about 100 p.s.i.g. to about 5000 p.s.i.g.; and separating the ortho-alkylated phenol from the reaction mixture.

12. The process for selectively alkylating a phenol, which comprises mixing a phenol having a replaceable hydrogen atom on the ring carbon atom para to the hydroxyl group and on at least one of the ring carbon atoms ortho to the hydroxyl group; from about 2 to about 5 moles of olefin having up to 10 carbon atoms per mole of phenol; about 0.001 to about 0.20 mole of an aluminum compound of the formula $Al(X)(X')_2$ where X is halogen and X' is selected from the group consisting of phenoxide and halogen; and from about 0.0006 to about 0.01 mole of water per mole of phenol; heating the resulting mixture comprising essentially said phenol, said olefin, said aluminum compound and said water at a temperature from about 100° C. to about 200° C. and a pressure from about 100 p.s.i.g. to about 5000 p.s.i.g.; and separating the ortho-alkylated phenol from the reaction mixture.

References Cited by the Examiner

UNITED STATES PATENTS

| 2,435,087 | 1/48 | Luten et al. | 260—621 |
| 2,537,337 | 1/51 | Fearey | 260—624 |
| 2,800,514 | 7/57 | Hathaway | 260—624 |
| 2,923,745 | 2/60 | Buls et al. | 260—624 |

FOREIGN PATENTS 806,182   12/58   Great Britain.

LEON ZITVER, *Primary Examiner.*

CHARLES B. PARKER, HAROLD G. MOORE,
*Examiners.*